United States Patent
Pearson

(10) Patent No.: US 7,751,553 B2
(45) Date of Patent: Jul. 6, 2010

(54) METHODS AND APPARATUS TO PROVIDE VOICE CONTROL OF A DIAL TONE AND AN AUDIO MESSAGE IN THE INITIAL OFF HOOK PERIOD

(75) Inventor: Larry B. Pearson, San Antonio, TX (US)

(73) Assignee: AT&T Knowledge Ventures I, L.P., Reno, NV (US)

( * ) Notice: Subject to any disclaimer, the term of this patent is extended or adjusted under 35 U.S.C. 154(b) by 1093 days.

(21) Appl. No.: 11/431,202

(22) Filed: May 9, 2006

(65) Prior Publication Data

US 2007/0274467 A1 Nov. 29, 2007

(51) Int. Cl.
*H04M 1/00* (2006.01)
(52) U.S. Cl. .................................. 379/352; 379/207.07
(58) Field of Classification Search ............... 379/88.01, 379/88.03, 88.23, 207.02, 207.04, 207.07, 379/352, 67.1
See application file for complete search history.

(56) References Cited

U.S. PATENT DOCUMENTS

| | | | |
|---|---|---|---|
| 5,111,501 A | 5/1992 | Shimanuki | |
| 5,150,399 A | 9/1992 | Yasuda | |
| 5,410,343 A | 4/1995 | Coddington et al. | |
| 5,483,579 A | 1/1996 | Stogel | |
| 5,535,264 A * | 7/1996 | Starr et al. | 379/88.25 |
| 5,881,134 A | 3/1999 | Foster et al. | |
| 6,038,305 A * | 3/2000 | McAllister et al. | 379/201.02 |
| 6,532,368 B1 | 3/2003 | Hild et al. | |
| 6,687,341 B1 * | 2/2004 | Koch et al. | 379/88.17 |
| 6,697,455 B2 | 2/2004 | Krofchalk | |
| 7,117,526 B1 | 10/2006 | Short | |
| 7,127,049 B2 | 10/2006 | Godse et al. | |
| 7,139,376 B2 | 11/2006 | Nabkel et al. | |
| 7,240,106 B2 | 7/2007 | Cochran et al. | |
| 7,418,486 B2 | 8/2008 | Brubacher et al. | |
| 7,499,532 B2 * | 3/2009 | Pearson et al. | 379/90.01 |
| 2002/0099814 A1 | 7/2002 | Mastrianni | |
| 2003/0005092 A1 | 1/2003 | Nelson et al. | |
| 2003/0112948 A1 | 6/2003 | Brown et al. | |
| 2004/0190692 A1 | 9/2004 | Gilbert | |
| 2005/0036590 A1 * | 2/2005 | Pearson et al. | 379/88.16 |
| 2005/0050357 A1 | 3/2005 | Jeng et al. | |

(Continued)

OTHER PUBLICATIONS

FTTH Applications, FTTH ONT (Optical Network Terminal), Scientific Atlanta, A Cisco Company, Part No. 7009999 Rev B, Jun. 2006, 3 pages.

(Continued)

*Primary Examiner*—Walter F Briney, III
(74) *Attorney, Agent, or Firm*—Hanley, Flight & Zimmerman, LLC

(57) ABSTRACT

Methods and apparatus to provide voice control of dial tone and audio message in a telephone in an initial off-hook period. A telephone system has a telephone with a receiver having an off-hook position. The telephone system provides a user with control of a telephone function. The telephone system includes an audio output to provide an audio message to the receiver in the off-hook position. The audio message includes an option for playing the audio message or a dial tone the next instance the receiver is in the off-hook position. A control interface receives a selected option in response to a user command.

29 Claims, 4 Drawing Sheets

U.S. PATENT DOCUMENTS

2008/0091793 A1   4/2008   Diroo et al.

OTHER PUBLICATIONS

Brian Perkins, "Reducing the Amount of Fiber in Fiber-to-the-Home Networks", Bechtel Technical Paper, Bechtel Telecommunications Technical Journal, vol. 4, No. 1, Jan. 2006, 9 pages.

Office Action, issued by the United States Patent and Trademark Office on Mar. 17, 2009, in connection with U.S. Appl. No. 11,549,777, 26 pages.

Office Action, issued by the United States Patent and Trademark Office on Oct. 15, 2009, in connection with U.S. Appl. No. 11/549,777, 21 pages.

* cited by examiner

METHODS AND APPARATUS TO PROVIDE VOICE CONTROL OF A DIAL TONE AND AN AUDIO MESSAGE IN THE INITIAL OFF HOOK PERIOD

FIELD OF THE DISCLOSURE

This disclosure relates generally to telephone systems, and, more particularly, to methods and apparatus to provide voice control of a dial tone and an audio message in the initial off-hook period.

BACKGROUND

In traditional telephones, a dial tone is emitted when the telephone receiver is activated (e.g. placed in the "off-hook" position). The dial tone informs a user that the telephone is awaiting dialing for connection into the telephone network. More recently, telephone service providers have offered a audio prompt which uses a voice message instead of the dial tone when the phone is in the off-hook position. Such prompts may give the user instructions for voice activated dialing (VAD) and/or be used for advertising and/or branding purposes.

The telephone user either hears a standard dial tone only or an audio prompt only. One issue created with having an audio prompt is that customer premise equipment (CPE) devices such as modems or fax machines cannot draw a dial-tone. Moreover, if the standard dial tone is used, another user may be unaware of the voice options available when the phone is off-hook.

DETAILED DESCRIPTION

In general, example methods and apparatus to provide voice activated control of a dial tone and audio message when a phone is in the initial off-hook position are disclosed. An example telephone system has a telephone with a receiver having an off-hook position. The telephone system provides a user with control of a telephone function. The telephone system includes an audio output to provide an audio message to the receiver in the off-hook position. The audio message includes an option for playing the audio message or a dial tone the next instance the receiver is in the off-hook position. A control interface receives a selected option in response to a user command.

Another example is a method of setting a voice activated prompt for a telephone in an off-hook position. An audio message is activated when the telephone is in the off-hook position. The audio message includes an option to play the audio message or a dial tone in the next instance when the telephone is in the initial off-hook position. The option to play the audio message or the dial tone in response to a user command is then activated.

Another example is an apparatus to provide control over the playing of a voice message or a dial tone on a telephone in an off-hook position. The apparatus includes a dial tone generator and an interactive voice response (IVR) controller. An off-hook controller is coupled to the dial tone generator and the IVR controller. The off-hook controller generates an audio message when the phone is in the off-hook position. The audio message includes options to play the audio message or generate a dial tone the next time the telephone is in the off-hook position. The dial tone generates a dial tone or the off-hook controller plays the audio message the next time the telephone is in the off-hook position in response to a command received on the IVR controller.

Another example is an apparatus comprising a controller to superimpose an audible voice signal when the telephone is in the off-hook state, the voice signal including a voice activated dialing prompt.

Another example is a switch module including a time slot interchanger (TSI) to establish communication with a phone system. A switch module processor (SMPU) is coupled to the TSI to respond to an off-hook signal from a telephone by transmitting an audio message to remind a user of availability of a dial tone or an audio message superimposed over a dial tone in response to an off-hook signal from the telephone.

Figure 1:
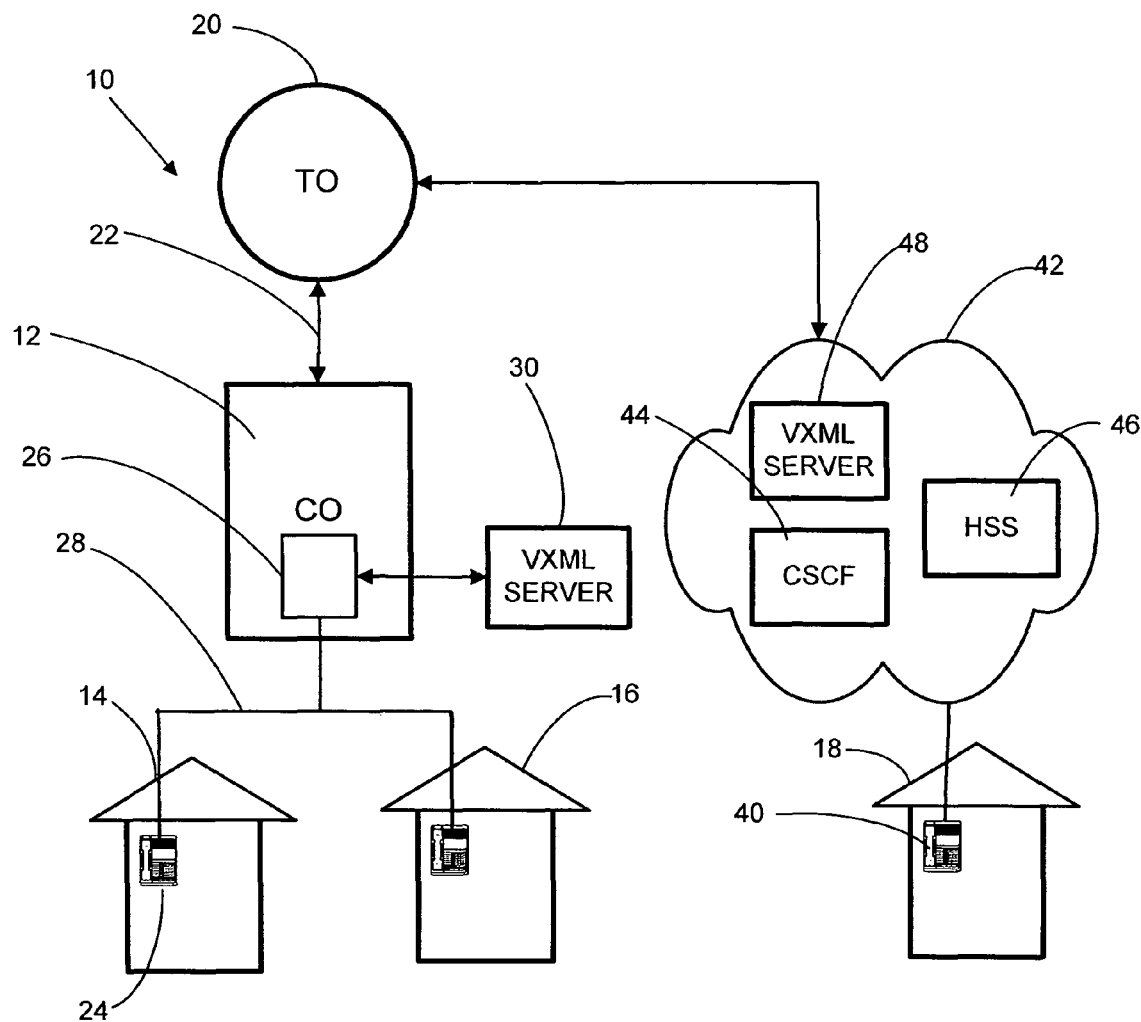
FIG. 1 illustrates an example telephone system to implement an example voice activated control system for a telephone in an initial off-hook position.

FIG. 1 shows a section of an example telephone network 10. The telephone network 10 may incorporate, or be incorporated within, the Public Switched Telephone Network (PSTN) or other type of telephone network. The telephone network 10 includes a number of central offices (CO) such as the central office 12 which is a public or local exchange having telecommunications switching hardware and related equipment and forming part of the PSTN. The switching hardware call-connects local residential and commercial telephone service subscribers to other subscribers in the system 10 and/or in other telephone systems. The central office 12 is connected to a number of subscribers such as households 14 and 16. Another subscriber such as the household 18 is part of a Voice over Internet Protocol (VoIP) telephone network. The telephone network 10 may have multiple central offices such as the central office 12 which are connected via trunk lines (not shown) as part of the PTSN. The telephone network 10 also includes a number of tandem offices (TOs) such as the tandem office 20 which has a number of tandem trunks including a tandem trunk 22 which is connected to the central office 12 and other trunks connected to other networks such as a VoIP network. The tandem office 20 includes one or more tandem switches and related switching hardware for serially and selectively connecting other central offices and other tandem offices. The tandem office(s) 20 and central office(s) 12 cooperate to route telephone calls and implement telephone services for subscribers. Each subscriber such as the households 14 and 16 have a phone such as the telephone set 24.

The central office 12 of the illustrated example has a number of switch modules such as a switch module 26. The switch module 26 serves as a termination point for a loop 28 which includes the lines to the subscribers and the trunks to the other central offices and the tandem offices. As will be described below, the switch module 26 generates dial tones for callers, detects dual-tone multiple frequency (DTMF) tones received via trunks and local loops from subscribers' telephone sets, and performs call processing and connection functions. The switch module 26 also triggers the ringing of subscribers' telephone sets, performs both analog-to-digital (A/D) and digital-to-analog (D/A) voice signal conversions, performs time-division switching of time slot interchangers (TSIs), and communicate busy signals to callers. The switch module 26 interfaces with a media server 30 which is a specialized server with speech recognition and text to speech capabilities that acts as a voice extensible markup language (VXML) browser. As will be explained below, the media server 30 allows various voice activated functions.

In the illustrated example, the household 18 has a Voice over Internet Protocol (VoIP) telephone set 40 which is coupled to an Internet Protocol (IP) multi-media subsystem (IMS) 42. The IMS is an open, standardized, operator friendly, Next Generation Networking (NGN) multi-media architecture for mobile and fixed IP services. The IMS in this example is a VoIP implementation based on a third generation partnership project (3GPP) variant of session initiation protocol (SIP), and runs over the standard Internet protocol (IP). It may be used by telecommunications operators in NGN networks which combine voice and data in a single packet switched network, to offer network controlled multi-media services.

The IMS 42 includes a call server 44, a home subscriber server (HSS) 46 and a media server 48. The call server 44 represents different SIP servers or proxies which are collectively termed CSCF (Call Server Control Function). CSCF elements are used to process SIP signaling packets within the IMS 42 (e.g., from the phone 40) and to perform session control. The home subscriber server 46 is the master user information database supporting the IMS network elements involved in call processing and sessions. It contains profile information, manages user authentication and authorization, and physical SIP endpoint location information. Similar to the media server 28, the media server 48 is a specialized server with speech recognition and text to speech capabilities that acts as a voice extensible markup language (VXML) browser.

Figure 2:
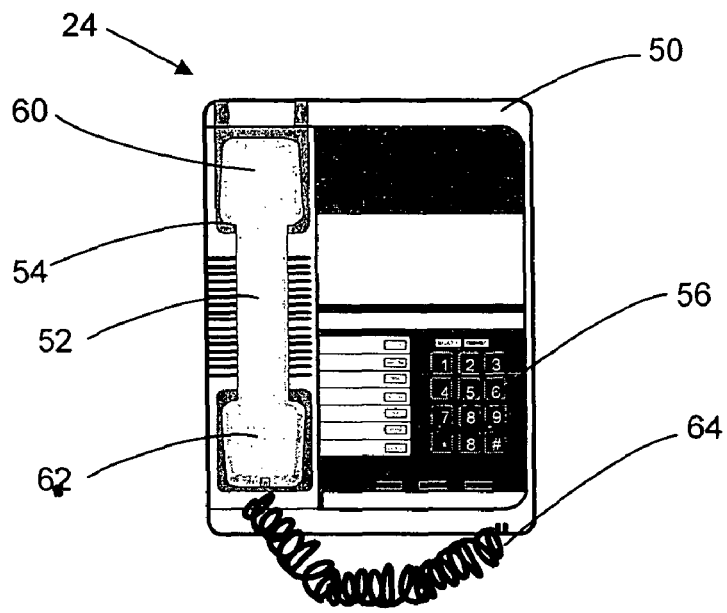
FIG. 2 illustrates an example telephone using the example voice activated control system.

An example telephone set 24 is illustrated in FIG. 2. The example telephone set 24 in the illustrated example is an analog or plain old telephone service (POTS) type telephone set. The telephone set 24 is similar to the VoIP telephone set 40 in FIG. 1. Those of ordinary skill in the art will understood that the voice activated control methods described below may be adapted to operate with POTS, VoIP and/or other types of telephone sets including, for example, electronic telephone sets, digital telephone sets, cellular telephone sets, and Integrated Services Digital Network (ISDN) telephone sets. The example telephone set 24 in FIG. 2 generally includes a base unit 50 and a handset 52. The base unit 50 primarily includes a cradle 54 and a touch-tone pad 56. A plungeable hookswitch (not shown) is located within the cradle 54 such that, whenever the handset 52 rests on the cradle 54, the hookswitch is depressed and plunged into the base unit 50. In such a case, the telephone 24 is in the "on hook" position. When, the user wishes to make a call, the handset 52 is lifted away from the cradle 54, the hookswitch is released and, under the influence of, for example, a spring, rises to protrude out from the cradle 54. The telephone set 24 is then in the "off-hook" position. The touch-tone pad 56 includes twelve push buttons that produce dual-tone multiple frequency (DTMF) tones suitable for dialing a desired phone number.

The handset 52 includes a receiver 60 and a transmitter 62. The receiver 60 includes a built-in speaker with which the user hears a dial tone and/or listens to electronic or pre-recorded messages, or hears the real-time voices of other phone users connected to the telephone network 10. The transmitter 62 includes a built-in microphone that can be spoken by a phone user or caller to communicate with another phone user connected to the telephone network 10 and/or to use the voice activated controls described below. The handset 52 is coupled to the base using a cord 64.

Those of ordinary skill in the art will understand that if the telephone set 24 of FIG. 2 were alternatively a cordless type telephone set, the touch-tone pad 56 could be located on the handset 52 instead of, or in addition to, being built into the base unit 50. Communication between the handset 52 and the base unit 50 is made possible in such an example via a short-range radio link between the handset 52 and the base unit 50.

Figure 3:
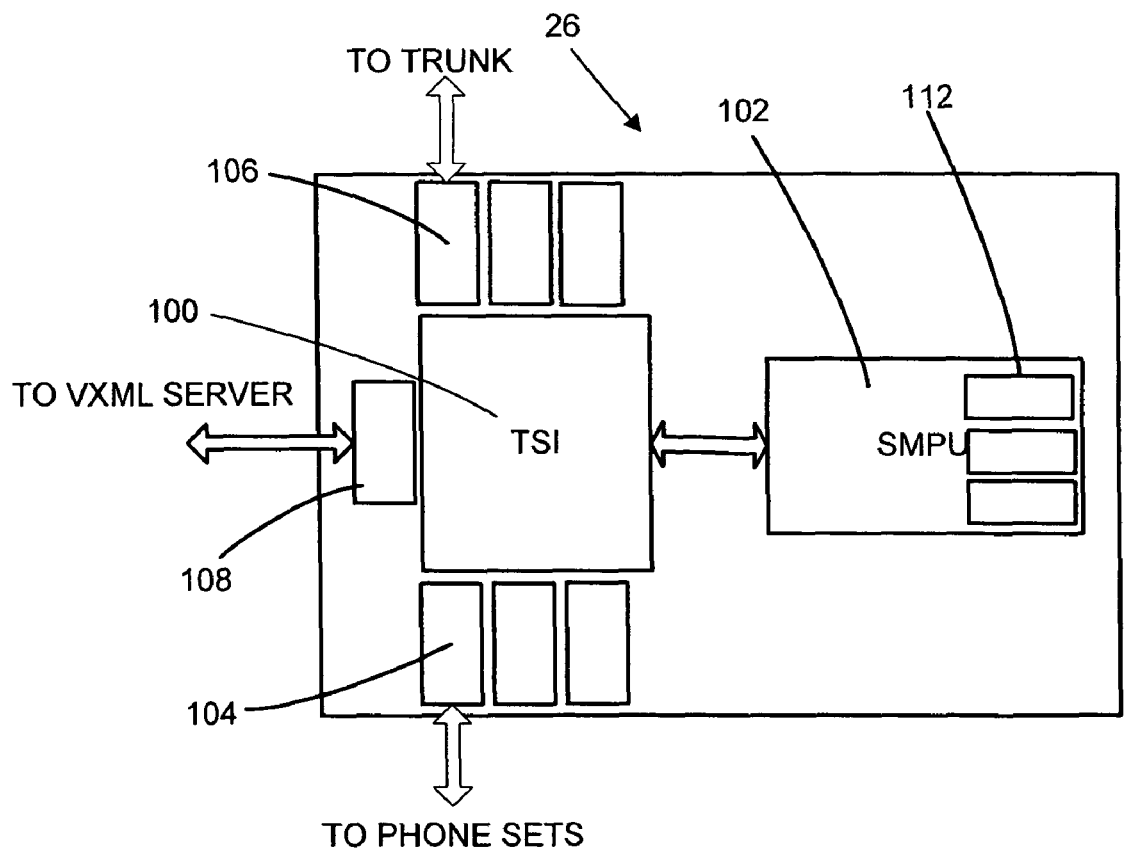
FIG. 3 illustrates an example switch module to implement the example voice activated control system.

FIG. 3 is a block diagram of the example switch module (SM) 26 of FIG. 1. The switch module 26 includes at least one time slot interchanger (TSI) 100 and a switch module processor unit (SMPU) 102. The time slot interchanger 100 is set in electrical communication with telephone lines associated with subscribers such as the households 14 and 16 via line units (LU) 104. The line units 104 in this example are printed circuit cards with ports which receive the telephone lines. The line units 104 include line circuits which scan the telephone lines associated with the subscribers to determine whether and when telephone sets are on or off the hook. The line units 104 also include other circuits and/or devices that perform analog-to-digital (AID) or digital-to-analog (D/A) voice signal conversions, provide overvoltage protection from lightning strikes, and perform loop transmission quality tests.

The time slot interchanger (TSI) 100 of the illustrated example is in electrical communication with trunk lines such as the tandem trunk 22 in FIG. 1 via trunk units (TU) 106. The trunk units 106 perform analog to-digital (AID) or digital-to-analog (D/A) voice signal conversions, provide overvoltage protection from lightning strikes, perform trunk transmission quality tests, and provide signal amplification and/or repetition. The TSI 100 implements a digitally-based time-division switching scheme for connecting calls between any two (or sometimes more) of the line units 104 and trunk units 106. The TSI 100 is also in communication with media servers such as the media server 28 in FIG. 1 via a voice interface unit 108.

The switch module processor unit (SMPU) 102 includes a set of special-function printed circuit (PC) cards 112. The switch module processor unit 102 cooperates with the time slot interchanger (TSI) 100 to process and connect calls. The special function printed circuit cards 112 include various electronic devices and/or circuitry to perform specialized services and functions. Such electronic devices and/or circuitry operate to, for example, decode dual-tone multiple frequency (DTMF) tones (e.g., dialed phone numbers) received from subscribers' telephone sets or modems, trigger the ringing of subscribers' telephone sets, and/or generate busy signals when appropriate for callers utilizing subscribers' telephone sets.

Figure 4:
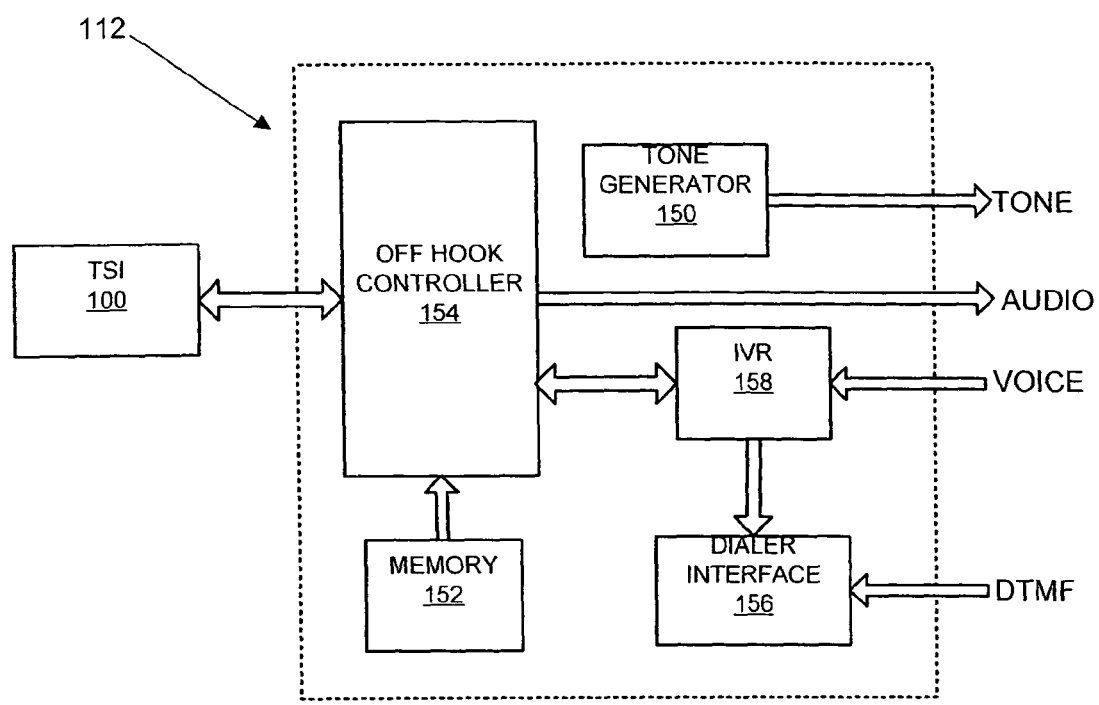
FIG. 4 is a block diagram of an example apparatus to implement the special-function printed circuit (PC) card of the example switch module in FIG. 3.

FIG. 4 shows a block diagram of an example apparatus to implement the special-function printed circuit (PC) card 112 mounted on the switch module processor unit (SMPU) 102. The apparatus may, for example, be implemented by a logic circuit in communication with and/or integral to the card 112, or may be implemented by software and/or firmware executed by the SMPU 102. In the illustrated example, the apparatus is implemented by a special-function printed circuit card 112 which includes a dial tone generator 150, a memory 152 and an off-hook controller 154. The special function card 112 also includes a dialer interface 156 and an interactive voice response (IVR) controller 158.

The dial tone generator 150 includes an oscillator circuit for generating a signal suitable for ultimately producing an audible dial tone within the receiver of a telephone set. In central offices within North America, for example, the oscillator circuit is preferably designed or tuned to produce an unbroken, oscillating (i.e., analog) electrical signal having a signal frequency within the conventional range of about 350 to 440 hertz (Hz). Outside North America, or within a private telephone network setting, the oscillator circuit may alternatively be designed to produce signals oscillating at frequencies within other frequency ranges.

The memory 152 stores a predetermined and/or pre-recorded audible information message or messages in digital format. In the illustrated example, the messages include voice or other activation options which offer access to various phone functions for the user when the telephone is initially off-hook. Depending on the functions enabled, different messages may be made available. The predetermined and/or pre-recorded audible information message may include, for example, human-intelligible words, symbolic sounds or tones, music, or any combination thereof. The audible information message of the illustrated example may be superimposed on the dial tone, and such that both the dial tone and the audible messages are perceptible at the user's telephone set 24.

The dialer interface 156 accepts DTMF tones from the telephone set 24 and translates the tones into a numerical code for the off-hook controller 154 to communicate with the TSI 100 in FIG. 3 to connect the telephone set 24 to another telephone set or other device (e.g., a fax machine). The dialer interface 154 also accepts other inputs in order to send the proper telephone numbers and/or other data and/or voice signals to the off-hook controller 154 to perform other functions as will be described below. The IVR 158 recognizes voice commands and directs the voice commands via the off-hook controller 154 and the TSI 100 to the media server 30 in FIG. 1. The IVR 158 interfaces to translate voice commands recognized by the media server 30 into dialing commands for the dialer interface 156 and/or commands to the off-hook controller 154 to set up and/or alter phone services.

Figure 5:
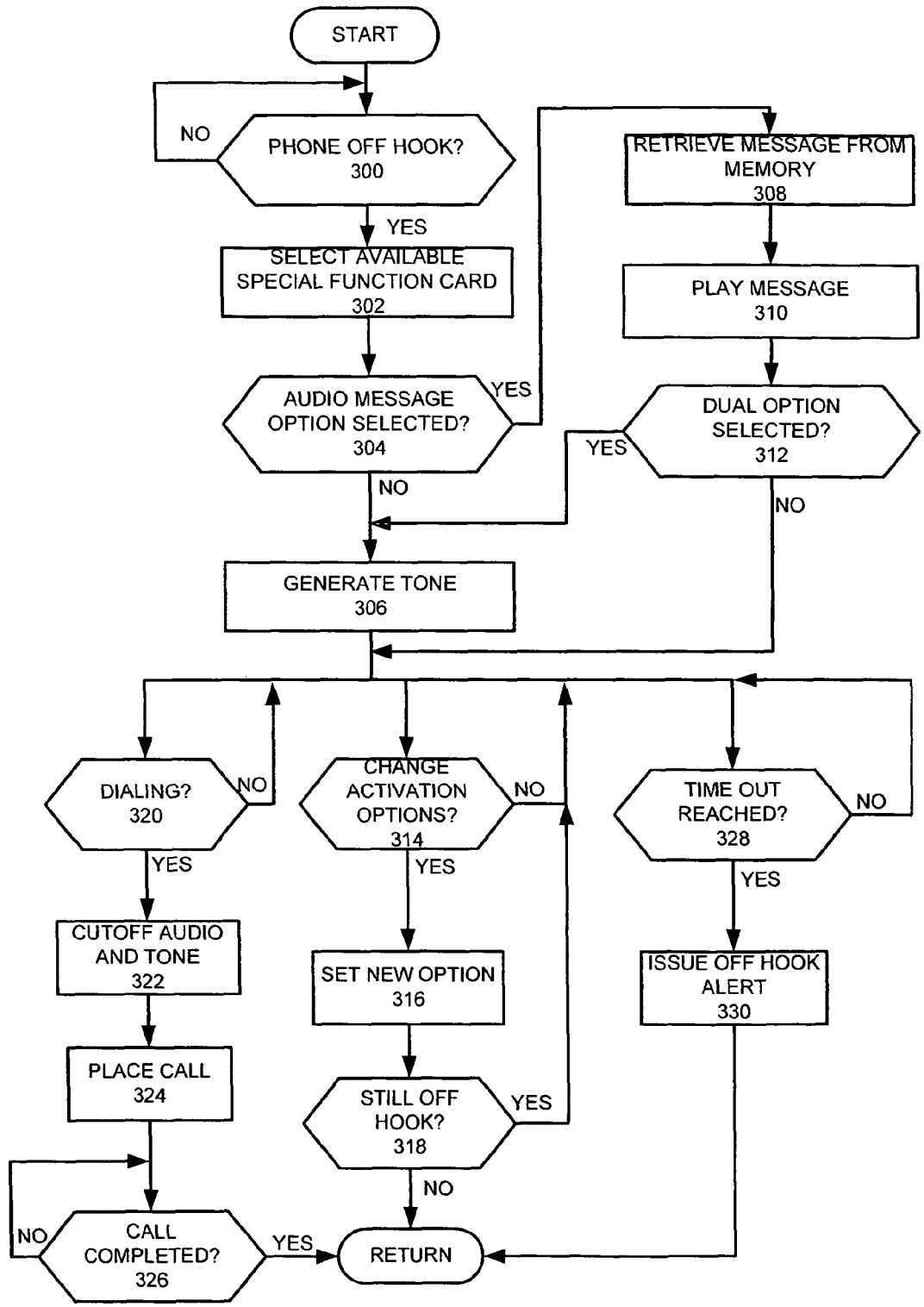
FIG. 5 is a flow diagram of an example process used by the example apparatus of FIG. 4 to control the superimposition of a voice activated control prompt and/or a dial tone during for the initial off-hook period.

FIG. 5 is a flow diagram of an example process to provide an audio prompt and/or to receive phone control commands and/or data. The flow diagram in FIG. 5 is executed in the illustrated example using the components of the network in FIG. 1 including the example apparatus of FIG. 4. However, those of ordinary skill in the art will understand that the process in FIG. 5 may be implemented using other types of communications networks such as the VoIP IMS network 42 in FIG. 1 and/or a cellular telephone network. When a caller desires to use a telephone set such as the telephone 24, the caller first takes the handset 62 of the telephone set 24 off-hook (e.g. by lifting the handset, selecting a talk or other button, an "on" button etc.). The line unit 104 detects the off-hook condition (block 300). Upon sensing the off-hook condition, the line unit 104 communicates the condition to the switch module processor unit (SMPU) 102 in FIG. 3 so that any one of the special-function printed circuit (PC) cards (e.g., the special function card 112) in FIG. 2 that is available (i.e., is not already being used) can be selected to process the session (block 302). Upon selecting an available special-function printed circuit card 112, the card 112 is then electronically set in switchable communication with the telephone set 24 by the SMPU 102. In this way, both the dial tone generator 150 and the off-hook controller 154 with the memory 152 are placed in communication with the receiver 50 of the telephone set 24.

The off-hook controller 154 determines whether the telephone set 24 has been set to play an audio message in the initial off-hook position (block 304). If the telephone set 24 has not been set to play an audio message, the dial tone generator 150 generates a signal suitable for producing an audible dial tone (block 306). Once the signal is generated, the signal is then transmitted through the line unit 104, and the telephone local loop 28, to the receiver 50 of the telephone set 24. Upon reaching the receiver 22, the signal is then converted into an acoustical soundwave, thereby ultimately producing an audible dial tone in the receiver 50.

If the audio message option has been selected in block 304, the corresponding stored audible information message is retrieved from the memory 152 (block 308) and transmitted, in the form of electrical signals, to the receiver 50. The electrical signals are similarly routed via the line unit 104 and the local loop 28 to the receiver 50. Upon reaching the receiver 50, the electrical signals are then converted into acoustical soundwaves, thereby ultimately producing an audio message (block 310). The off-hook controller 154 then checks the setting for the telephone set 24 to determine if the telephone set 24 is set to activate both an audio message and a dial tone (block 312). If the telephone set 24 is set to activate both an audio message and-a dial tone, the off-hook controller 154 loops to block 306 to activate the tone generator 150, thus causing both an audible dial tone and an audio information message to be simultaneously played at the receiver 50 of the telephone set 24.

In the dual tone/audio message mode, the audio message is communicated to the receiver of the telephone set 24 in a whisperlike or low-decibel manner. Thus, the audio message is superimposed over the dial tone so that the message can be heard and understood by a human caller, but the dial tone may be properly discerned by consumer equipment such as a modem or fax machine. The overall decibel level associated with the audio message is lower than the decibel level associated with the audible dial tone. In this way, the consumer equipment will properly detect the dial tone even while the audible information message is being simultaneously communicated to the consumer equipment. In addition to decibel level, it is to be understood, however, that other phonetic, acoustical, and/or electrical design factors may need to be tuned and/or tweaked within a given system or phone network in order to obtain an ideal and balanced superimposition of the audio message over the dial tone. Such other design factors may include, for example, volume levels, loudness, pitch, frequency levels, acoustical decibel (dB) levels, electronic decibel (dB) levels, signal strength levels, carrier-to-interference (C/I) ratios, decibel levels referenced from 1 milliwatt (dBm), etc.

As explained above, the audio message may contain instructions to enable the user to voice dial, set options for voice dial and/or options to establish settings for playing a dial tone, an audio message or both, the next time the telephone set 24 is in the initial off-hook position. A control interface such as the dialer interface 156 of the illustrated example monitors the line for input signals such as push button DTMF tone(s) (e.g., "*" or "#") from the touch-tone pad 56 which may be specific to option setting commands (block 314) or normal dialing (block 320) and/or the IVR 158 of the illustrated example monitors the line for a voice command (block 320) or dialing instructions (block 314). The off-hook controller also determines whether a time limit has been reached for the phone to be in the off-hook state (block 328).

If a valid command to change or set an option is received (block 314), the off-hook controller 154 changes the setting for the telephone set 24 (block 316). This change may be a permanent change or a change for only the next call. The change may be effective immediately or for the next call. The commands received at block 314 may be voice commands or DTMF commands.

In the case of a DTMF tone, various numbers or number sequences are detected by the dialer interface 156 and used to select and/or set options. In the case of voice commands, voice signals are detected by the IVR controller 158, which in conjunction with the media server 30 translates the voice signals to digital codes and forward the codes to the off-hook controller 154. In the illustrated example, a user may select whether they will hear dial tone, audio message only, or both dial tone and audio message when the receiver is in the off-hook position. Of course those of ordinary skill in the art will appreciate that other settings may be entered via the telephone touch tone pad and/or via voice command including, for example, the duration of time a particular setting is valid, and/or a schedule when different options are employed. Other options include the activation/deactivation of voice dialing, entering phone numbers which may be activated by voice dialing etc. The off-hook controller 154 determines whether the receiver is still in the off-hook position (block 318). If the receiver is still in the off-hook position the off-hook controller 154 returns to the monitoring state. If the receiver is not in the off-hook position, the off-hook controller 154 returns to a waiting state.

The dialer interface 156 and IVR 158 also monitor for phone number dialing (block 320). If no input is detected, the off-hook controller 154 will return to the monitoring state. If a dialing sequence is detected i.e., the caller has begun to dial a telephone number by pressing the push buttons on the touch-tone pad 56 of the telephone set 24 as sensed by the switch module processor unit 102 (block 318) or by voice via the IVR 158, the audible dial tone and/or the audible information message are terminated (block 322). The telephone number dialed by the caller is decoded, processed, and ultimately utilized to establish a call path connection (block 324) to the desired destination telephone set. The off-hook controller 154 then determines whether the call has been completed (block 326) and returns to the waiting state if the call has been completed.

The off-hook controller 154 also determines if the time for dialing has been timed out (block 328). If the time for dialing has been timed out, the off-hook controller 154 issues an off-hook alarm to the telephone set 24 to alert the user that the telephone is off-hook (block 330) and returns to the waiting state. If the time for dialing has not been timed out (block 328), the off-hook controller 154 continues in the monitoring state.

The process in FIG. 5 may also be used by a VoIP telephone network. In the instance of a VoIP telephone set such as the telephone set 40, when the phone is off-hook, the telephone set 40 makes a session initiation protocol (SIP) request to the call server 44 (block 300). Since the process for the VoIP context does not require the special function line card, block 302 may be eliminated in the VoIP application. The call server 44 determines whether the telephone set 40 has been set to an audio message via the home subscriber server (HSS) 46 (block 304). If the call server 44 determines the telephone set 40 has not been set to receive an audio message, the call server 44 generates a signal to produce an audible dial tone (block 306) at the receiver of the telephone set 40.

If the audio message option has been selected in block 304, a stored audible information message associated with the telephone set 40 is retrieved by the call server 44 from the media server 48 (block 308), transmitted to the telephone set 40 and played (block 310). The call server 44 then checks the setting for the telephone set 40 to determine if the telephone set 40 is set to activate both an audio message and a dial tone (block 312). If the telephone set 40 is set to activate both an audio message and a dial tone, the call server 44 loops to block 306 to activate the audio tone, thus causing both an audible dial tone and an audible information message to be simultaneously played at the telephone set 40.

As explained above, the audio message may contain instructions to voice dial, options to voice dial and/or options to reset the settings for off-hook the next time the telephone set 40 is used. The media server 48 of the illustrated example serves as a control interface and monitors the network for input signals such as push button DTMF tone (e.g., "*" or "#") and/or voice commands (block 314). If a valid command to change or set an option is received (block 314), the media server 48 receives the command and communicates with the call server 44 to change the setting for the telephone set 40 in the HSS 46 (block 316). In the illustrated example, a user may select whether they will hear dial tone, audio message only, or both dial tone and audio message when the receiver is in the off-hook position. Of course those of ordinary skill in the art will appreciate that other settings may be entered via the telephone touch tone pad and/or via voice command including, for example, the duration of time a particular setting is valid, and/or a schedule when different options are employed. Other options include the activation/deactivation of voice dialing, entering phone numbers which may be activated by voice dialing etc. The call server 44 determines whether the receiver is still in the off-hook position (block 318). If the receiver is still in the off-hook position the call server 44 returns to the monitoring state. If the receiver is not in the off-hook position, the call server 44 returns to a waiting state.

The media server 48 in FIG. 1 also monitors for phone number dialing (block 320). If no input is detected, the call server 44 will return to the monitoring state. If a dialing sequence is detected i.e., the caller has begun to dial a telephone number by pressing the push buttons on the touch-tone pad of the telephone set 40 or by voice, the audible dial tone and/or the audible information message are terminated (block 322). The telephone number dialed by the caller is decoded, processed, and ultimately utilized to establish a call path connection (block 324) to the desired destination telephone set. The call server 44 then determines whether the call has been completed (block 326) and returns to the waiting state if the call has been completed.

The call server 44 also determines if the time for dialing has been timed out (block 328). If the time for dialing has been timed out, the call server 44 issues an off-hook alarm to the telephone set 24 to alert the user that the telephone is off-hook (block 330) and returns to the waiting state. If the time for dialing has not been timed out (block 328), the call server 44 continues in the monitoring state.

In addition to a VoIP telephone network, the voice activated controls may also easily be adapted and operatively incorporated within the base unit of an ISDN (Integrated Services Digital Network) telephone set situated and connected within an ISDN-compatible public or private telephone network. Furthermore, the voice activated control may also be adapted and easily incorporated within telephone networks that include, for example, Centrex systems, key systems, automatic call distributing (ACD) systems, various electronic or digital telephone sets, various proprietary telephone sets (for example, "P" phones), and DSL (Digital Subscriber Line) or broadband technologies.

At least some of the above described example methods and/or apparatus are implemented by one or more software and/or firmware programs running on a computer processor. However, dedicated hardware implementations including, but not limited to, application specific integrated circuits, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or apparatus described herein.

It should also be noted that the example software and/or firmware implementations described herein are optionally stored on a tangible medium, such as: a magnetic medium (e.g., a magnetic disk or tape); a magneto-optical or optical medium such as an optical disk; or a solid state medium such as a memory card or other package that houses one or more read-only (non-volatile) memories, random access memories, or other re-writable (volatile) memories; or successor physical media.

To the extent the above specification describes example components and functions with reference to particular standards and protocols, it is understood that the scope of this patent is not limited to such standards and protocols. For instance, each of the standards for Internet and other packet switched network transmission (e.g., Transmission Control Protocol (TCP)/Internet Protocol (IP), User Datagram Protocol (UDP)/IP, HyperText Markup Language (HTML), HyperText Transfer Protocol (HTTP)) represent examples of the current state of the art. Such standards are periodically superseded by faster or more efficient equivalents having the same general functionality. Accordingly, replacement standards and protocols having the same functions are equivalents which are contemplated by this patent and are intended to be included within the scope of the accompanying claims.

Although this patent discloses example systems including software or firmware executed on hardware, it should be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, while the above specification described example systems, methods and articles of manufacture, persons of ordinary skill in the art will readily appreciate that the examples are not the only way to implement such systems, methods and articles of manufacture. Therefore, although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A telephone system having a telephone with a receiver having an off-hook position to provide a user with control of a telephone function, the telephone system comprising:
    an audio output to provide an audio message to the receiver in the off-hook position, the audio message including an option for playing the audio message or a dial tone during a next instance the receiver is in the off-hook position; and
    a control interface to receive a selected option in response to a user command.

2. The telephone system of claim 1 further comprising a dialer which dials a number in response to a voice command.

3. The telephone system of claim 1 wherein the audio output provides a dial tone when the telephone receiver in the off-hook position, and the audio message is superimposed over the dial tone.

4. The telephone system of claim 1 wherein the audio message includes an option for the audio output to provide a dial tone alone on the receiver for the next instance the receiver is off-hook.

5. The telephone system of claim 1 wherein the audio message includes an option for the audio output to provide an audio message superimposed over a dial tone for the next instance the receiver is off-hook.

6. The telephone system of claim 1 wherein the audio message allows a user to set a future time duration via a command to a voice activated interface during which the audio output provides an audio message to the receiver when the receiver is in the off-hook position.

7. The telephone system of claim 1 wherein the telephone comprises at least one of a plain old telephone set (POTS) or a Voice over Internet Protocol (VoIP) telephone.

8. The telephone system of claim 1 wherein the user command comprises one of a dual-tone multiple-frequency (DTMF) key entry or a voice command.

9. A method of setting a voice activated prompt for a telephone in an off-hook position, comprising:
    activating an audio message when the telephone is in the off-hook position, the audio message including an option to play the audio message or a dial tone in a next instance when the telephone is in the off-hook position; and
    activating the option to play the audio message or the dial tone in response to a user command.

10. The method of claim 9 wherein the audio message includes the option of dialing a telephone number.

11. The method of claim 9 further comprising emitting a dial tone when the telephone is in the off-hook position, the audio message being superimposed over the dial tone.

12. The method of claim 9 wherein the audio message includes an option for emitting a dial tone only for the next instance the telephone is off-hook; and wherein the dial tone is activated in the next instance the telephone is off-hook.

13. The method of claim 9 wherein the audio message includes an option for a voice activated interface superimposed over a dial tone for the next instance the telephone is off-hook, and wherein an audio message giving a user access to the voice activated interface is superimposed over the dial tone for the next instance the telephone is off-hook.

14. The method of claim 9 wherein the audio message includes an option for a voice activated interface when the phone is in the off-hook position at a future time, and activating a voice activated interface when the phone is in the off-hook position after the future time.

15. The method of claim 9 wherein the telephone comprises at least one of a plain old telephone set (POTS) or a Voice over Internet Protocol (VoIP) telephone.

16. The method of claim 9 wherein the user command comprises at least one of a voice command or a dual-tone multiple-frequency (DTMF) key entry.

17. An apparatus to provide control over the playing of a voice message or a dial tone on a telephone in an off-hook position, the apparatus comprising:
    a dial tone generator;
    an interactive voice response (IVR) controller;
    an off-hook controller in communication with the dial tone generator and the IVR controller, the off-hook controller generating an audio message when the phone is in the off-hook position, the audio message including options to play the audio message or generate a dial tone during a next time the telephone is in the off-hook position; and wherein the dial tone generates a dial tone or the off-hook controller plays the audio message the next time the telephone is in the off-hook position in response to a command received by the IVR controller.

18. The apparatus of claim 17 further comprising a dialer which dials a number in response to a voice command received by the IVR controller.

19. The apparatus of claim 17 wherein the audio message includes an option for superimposing the audio message over the dial tone the next time the telephone is in the off-hook position; and wherein the dial tone generates a dial tone and the off-hook controller plays the audio message the next time the telephone is in the off-hook position in response to a command received on the IVR controller.

20. A switch module comprising:
a time slot interchanger (TSI) to establish communication with a phone system; and
a switch module processor (SMPU) coupled to the TSI to respond to an off-hook signal from a telephone by transmitting an audio message to remind a user of availability of a dial tone or an audio message superimposed over a dial tone in response to an off-hook signal from the telephone.

21. The switch module of claim 20 wherein the audio message reminds a user of availability of a voice activated dialing service.

22. The switch module of claim 21 further comprising:
an interactive voice recognition (IVR) controller;
a dialer coupled to the IVR; and
wherein the SMPU accepts a voice input and controls the dialer to dial a phone number and wherein the TSI connects the phone with the phone number.

23. A tangible article of manufacture storing machine-accessible instructions that, when executed, cause a machine to:

activate an audio message when a telephone enters an off-hook position, the audio message including an option to play the audio message or a dial tone during a next instance when the telephone is in the off-hook position; and activate the option to play the audio message or the dial tone in response to a user command.

24. The article of manufacture of claim 23 wherein the audio message includes the option of dialing a telephone number.

25. The article of manufacture of claim 23 wherein the machine-accessible instructions, when executed, cause the machine to emit a dial tone when the telephone is in the off-hook position, and wherein the audio message is superimposed over the dial tone.

26. The article of manufacture of claim 23 wherein the audio message includes an option for emitting a dial tone only for the next instance the telephone is off-hook; and the dial tone is activated in the next instance the telephone is off-hook.

27. The article of manufacture of claim 23 wherein the audio message includes an option for a voice activated interface superimposed over a dial tone for the next instance the telephone is off-hook, and an audio message giving a user access to the voice activated interface is superimposed over the dial tone during the next instance the telephone is off-hook.

28. The article of manufacture of claim 23 wherein the audio message includes an option for a voice activated interface when the phone is in the off-hook position at a future time, and activating a voice activated interface when the phone is in the off-hook position after the future time.

29. The article of manufacture of claim 23 wherein the user command comprises at least one of a voice command or a dual-tone multiple-frequency (DTMF) key entry.

* * * * *